United States Patent
Bandhole et al.

(10) Patent No.: US 7,496,920 B1
(45) Date of Patent: *Feb. 24, 2009

(54) DYNAMIC COMPUTING ENVIRONMENT USING REMOTELY ALLOCABLE RESOURCES

(75) Inventors: Jagadish Bandhole, San Jose, CA (US); Sekaran Nanja, San Jose, CA (US); William Blume, Santa Clara, CA (US); Carleton Miyamoto, Santa Clara, CA (US)

(73) Assignee: Symantec Operating Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/767,666

(22) Filed: Jun. 25, 2007

Related U.S. Application Data

(63) Continuation of application No. 09/861,483, filed on May 17, 2001, now Pat. No. 7,278,142.

(60) Provisional application No. 60/228,105, filed on Aug. 24, 2000.

(51) Int. Cl.
G06F 9/46 (2006.01)

(52) U.S. Cl. .................. 718/104; 709/217; 709/226; 709/229

(58) Field of Classification Search ............ 718/104; 709/217, 226, 229
See application file for complete search history.

(56) References Cited

U.S. PATENT DOCUMENTS

| | | | | |
|---|---|---|---|---|
| 4,925,311 A | 5/1990 | Neches et al. | ............... | 364/200 |
| 5,109,510 A * | 4/1992 | Baker et al. | ................ | 718/104 |
| 5,394,522 A | 2/1995 | Sanchez-Frank et al. | .... | 395/159 |
| 5,410,707 A | 4/1995 | Bell | ............... | 713/2 |
| 5,418,918 A | 5/1995 | Vander Kamp et al. | ........ | 713/2 |
| 5,452,454 A | 9/1995 | Basu | .............. | 713/2 |
| 5,463,766 A | 10/1995 | Schieve et al. | ................ | 713/2 |
| 5,479,599 A | 12/1995 | Rockwell et al. | ............ | 715/837 |
| 5,515,524 A | 5/1996 | Lynch et al. | ................ | 395/500 |
| 5,555,370 A | 9/1996 | Li et al. | ...................... | 395/161 |
| 5,577,210 A | 11/1996 | Abdous et al. | ............. | 709/219 |
| 5,668,995 A | 9/1997 | Ghat | ......................... | 395/674 |
| 5,694,600 A | 12/1997 | Khenson et al. | ............... | 713/2 |
| 5,727,213 A | 3/1998 | Vander Kamp et al. | ........ | 713/2 |
| 5,771,354 A | 6/1998 | Crawford | .................... | 709/229 |
| 5,842,011 A | 11/1998 | Basu | ............................. | 713/2 |
| 5,872,956 A * | 2/1999 | Beal et al. | .................... | 709/224 |

(Continued)

OTHER PUBLICATIONS

Huang, Peter, California Polytechnic State University *Design and Implementation of the CiNIC Software Architecture on a Windows Host*, Feb. 2001, pp. i-87.

(Continued)

*Primary Examiner*—Andy Ho
(74) *Attorney, Agent, or Firm*—Campbell Stephenson LLP

(57) ABSTRACT

A system and a method of providing a dynamic computing environment to a user, in which the dynamic computing environment is configured to communicate and to operate under the control of the user. The dynamic computing environment has one or more virtual resources including at least one virtual computing device and one or more computer programs associated with the at least one virtual computing device. According to the present invention, the user has access, for example, to interact with, to modify, and to use the dynamic computing environment including the at least one virtual resource and the at least one physical resource.

12 Claims, 5 Drawing Sheets

U.S. PATENT DOCUMENTS

| | | | | |
|---|---|---|---|---|
| 5,894,571 | A | 4/1999 | O'Connor | 395/652 |
| 5,942,738 | A | 8/1999 | Cesaire et al. | 235/380 |
| 5,948,101 | A | 9/1999 | David et al. | 713/2 |
| 5,961,582 | A * | 10/1999 | Gaines | 718/1 |
| 5,966,130 | A * | 10/1999 | Benman, Jr. | 345/418 |
| 5,974,547 | A | 10/1999 | Klimenko | 713/2 |
| 6,009,507 | A | 12/1999 | Brooks et al. | 712/28 |
| 6,058,113 | A | 5/2000 | Chang | 370/390 |
| 6,081,846 | A | 6/2000 | Hyder et al. | 709/250 |
| 6,081,864 | A | 6/2000 | Lowe et al. | 710/129 |
| 6,085,318 | A | 7/2000 | Vander Kamp et al. | 713/1 |
| 6,092,189 | A | 7/2000 | Fisher et al. | 713/1 |
| 6,101,601 | A | 8/2000 | Matthews et al. | 713/2 |
| 6,182,123 | B1 | 1/2001 | Filepp et al. | 709/217 |
| 6,182,275 | B1 | 1/2001 | Beelitz et al. | 717/175 |
| 6,189,100 | B1 | 2/2001 | Barr et al. | 713/182 |
| 6,202,091 | B1 | 3/2001 | Godse | 709/222 |
| 6,230,200 | B1 | 5/2001 | Forecast et al. | 709/226 |
| 6,259,448 | B1 | 7/2001 | McNally et al. | 345/348 |
| 6,262,726 | B1 | 7/2001 | Stedman et al. | 345/333 |
| 6,298,443 | B1 | 10/2001 | Colligan et al. | 713/200 |
| 6,304,965 | B1 | 10/2001 | Rickey | 713/2 |
| 6,308,238 | B1 | 10/2001 | Smith et al. | 710/310 |
| 6,370,560 | B1 | 4/2002 | Robertazzi et al. | 718/105 |
| 6,374,336 | B1 | 4/2002 | Peters et al. | 711/167 |
| 6,393,557 | B1 | 5/2002 | Guthridge et al. | 713/1 |
| 6,421,777 | B1 | 7/2002 | Pierre-Louis et al. | 713/2 |
| 6,446,126 | B1 | 9/2002 | Huang et al. | 709/226 |
| 6,463,530 | B1 | 10/2002 | Sposato | 713/2 |
| 6,466,972 | B1 | 10/2002 | Paul et al. | 709/222 |
| 6,466,978 | B1 * | 10/2002 | Mukherjee et al. | 709/225 |
| 6,477,624 | B1 | 11/2002 | Kedem et al. | 711/147 |
| 6,493,679 | B1 | 12/2002 | Rappaport et al. | 705/29 |
| 6,498,791 | B2 | 12/2002 | Pickett et al. | 370/353 |
| 6,512,526 | B1 | 1/2003 | McGlothlin et al. | 345/762 |
| 6,539,456 | B2 | 3/2003 | Stewart | 711/113 |
| 6,543,047 | B1 | 4/2003 | Vrhel, Jr. et al. | 717/121 |
| 6,550,006 | B1 | 4/2003 | Khanna | 713/2 |
| 6,560,606 | B1 | 5/2003 | Young | 707/100 |
| 6,564,112 | B1 | 5/2003 | Factor | 700/97 |
| 6,577,229 | B1 | 6/2003 | Bonneau et al. | 340/10.41 |
| 6,578,141 | B2 | 6/2003 | Kelley et al. | 713/1 |
| 6,598,131 | B2 | 7/2003 | Kedem et al. | 711/147 |
| 6,601,166 | B1 | 7/2003 | Ayvar et al. | 713/2 |
| 6,615,250 | B1 * | 9/2003 | Brunet et al. | 709/218 |
| 6,615,365 | B1 | 9/2003 | Jenevein et al. | 714/6 |
| 6,633,916 | B2 | 10/2003 | Kauffman | 709/229 |
| 6,662,267 | B2 | 12/2003 | Stewart | 711/113 |
| 6,668,327 | B1 | 12/2003 | Prabandham et al. | 713/2 |
| 6,684,327 | B1 | 1/2004 | Anand et al. | 713/2 |
| 6,711,688 | B1 | 3/2004 | Hubacher et al. | 713/201 |
| 6,748,525 | B1 | 6/2004 | Hubacher et al. | 713/1 |
| 6,757,837 | B1 | 6/2004 | Platt et al. | 714/4 |
| 6,802,062 | B1 * | 10/2004 | Oyamada et al. | 718/1 |
| 6,804,774 | B1 | 10/2004 | Larvoire et al. | 713/2 |
| 6,810,478 | B1 | 10/2004 | Anand et al. | 713/2 |
| 2003/0046529 | A1 | 3/2003 | Loison et al. | 713/2 |

OTHER PUBLICATIONS

Henry, Mike, Intel Corporation, *Extending PXE to Mobile Platforms*, Jun. 1998, pp. 1-4.

International Search Report as mailed from the PCT on Aug. 13, 2004 for WO Application (PCT/US03/28820; Filed Sep. 10, 2003), 3 pages).

Sekaran Nanja, "User Interface for Dynamic Computing Environment Using Allocatable Resources," Filed Sep. 15, 2000, U.S. Appl. No. 09/663,252, 27 pages of specification (including claims and abstract), and 5 sheets of drawings.

Sekaran Nanja, "System for Configuration of Dynamic Computing Environments Using a Visual Interface," Filed Sep. 15, 2000, U.S. Appl. No. 09/662,990, 23 pages of specification (including claims and abstract), and 2 sheets of drawings.

Simon—"Computer System Built to Order"—Nov. 25, 1996—Newsgoups: demon.adverts,midlands.adverts, sanet.adverts, solent.forsale, uk.adverts.computer, unet.adverts, uk.adverts.other, dungeon.forsale.

Debenham, Clive, "Taos: The Operating System," May 29, 1995, Tantric Technologies, Newsgroups: comp.parallel.

Application Developers's Training Course, SNAP 8.0 Training Participant Guide, Module 7, Copyright © 1997, Template Software, Inc., pp. 7-1 through 7-34.

Workflow Template, Developing A WFT Workflow System, Copyright © 1998, Template Software, Inc.

Workflow Template, Using the WFT Development Environment, Copyright © 1998, Template Software, Inc.

Web Component, Using the Web Component, Copyright © 1997, Template Software, Inc.

* cited by examiner

DYNAMIC COMPUTING ENVIRONMENT USING REMOTELY ALLOCABLE RESOURCES

CROSS-REFERENCES TO RELATED APPLICATIONS

This application is a continuation of U.S. patent application Ser. No. 09/861,483, entitled "Dynamic Computing Environment Using Remotely Allocable Resources," filed May 17, 2001, and naming Jagadish Bandhole, Sekaran Nanja, William Blume and Carleton Miyamoto as inventors (issued as U.S. Pat. No. 7,278,142 on Oct. 2, 2007), which in turn claims priority from U.S. Provisional Application No. 60/228,105 entitled "Dynamic Computing Environment Using Allocateable Resources," filed on Aug. 24, 2000. This application is also related to U.S. patent application Ser. Nos. 09/663,252 (issued as U.S. Pat. No. 7,082,521 on Jul. 25, 2006) and 09/662,990 (issued as U.S. Pat. No. 7,065,637 on Jun. 20, 2006), respectively entitled "User Interface for Dynamic Computing Environment Using a Allocateable Resources" and "System for Configuration of Dynamic Computing Environment Using a Visual Interface," filed Sep. 15, 2000. All of the above-identified applications and their disclosures are incorporated herein by reference for all purposes.

BACKGROUND OF THE INVENTION

The present invention relates in general to information processing, and more specifically to a system which facilitates dynamic allocation and de-allocation of computing resources such as digital processors, networks, storage devices and software to create a virtual computing environment using an arrangement of networked processors and processes.

Today, computers are increasingly being used in almost every area of commerce, education, entertainment and productivity. With the growing popularity of the Internet, corporate and campus intranets, home networking and other networks, the trend is to use multiple computers, or processing platforms, to perform tasks and provide services. The networked processors approach is in contrast to traditional approaches of running a single application as a stand-alone application on a single computer.

One approach to networked processing is a "client-server" model whereby a server computer on the Internet is used to transfer information to a client computer. Typically, the client computer is located at an end user's location, such as a personal computer in a user's home. This allows large amounts of information to be stored in, and accessed from, the server computer by many client computers. The client computers can access the server computer simultaneously. Another approach allows a user to obtain portions of executable programs from the server to operate an application program in functional "pieces" or components, on the client computer. For example, a user can run a word-processing program in a client-server mode where the server provides portions of the word-processing software to the user's computer on an as-needed basis.

Yet another model is the Application Service Provider (ASP) model. This removes the application still further from the end-user and can involve more processors, such as servers. The ASP model allows a primary server to host a client-server application, or to host any type of data-processing resource such as a database, user interface, program component, data object, etc. The application can appear to the client as being hosted by the primary server when it is actually being provided by one or more other servers. The other servers can provide the application, or components, by having the client directly access the other server, or having the client access the other server through the primary server.

Still other models are possible. Any arbitrary arrangement of processors can be used to provide a service or function to an end user, or to another device such as another processor, consumer electronic device, etc. Examples of such systems are groups of computers used to perform a large mathematical task, such as rendering frames of a video sequence or performing a simulation. Systems that use many processors to exchange information, such as email systems, multicasting programs, voice-over-IP communications, etc., can potentially require hundreds, or even thousands or more, networked processors.

Software is necessary to operate each of these models. Each of the systems described above will likely use multiple software processes on each processing platform. Most likely, the different software processes are designed by different software manufacturers. Although there are standard specifications to design compatible software, such software is still designed largely independently of other manufacturers' software. For example, a user may be running an operating system and web browser designed by different companies. Additional processes may be concurrently executing on the user's computer.

Thus, many independently-designed hardware devices and software processes must be coordinated in order for the overall networked system to operate correctly and effectively. This complexity is multiplied by the number of users that the system is designed to support. For example, where the system is an Internet system it is common for the user base to be in the hundreds of thousands, or millions. There may be hundreds or thousands (or more) simultaneous users operating client processing systems that require tens, or even hundreds, of servers for adequate bandwidth. Different servers in the networked system may perform different functions such as web page serving, database maintenance, caching, etc.

This complexity further manifests itself in another aspect. In the past, software applications used to be monolithic. That is, the application was self-contained within a box with no interaction with other applications, where a box is a computing device or computing machine. However, this paradigm is no longer true. With Internet and e-commerce applications, for example, a client application is configured to communicate with a remotely located server application, such as eBay.com®, or Amazon.com®, or the like. Typically, e-commerce applications define a three-tier architecture that includes: (1) client; (2) server; and (3) database. Within this architecture, the client may be running an Intel® box with a Microsoft Windows X86® environment, the server may be running a Sun Microsystems® box running an iPlanet™ application, the database may be Sun Microsystems) box running Oracle®, for example. Therefore, this three-tiered architecture increases the complexity and cost of many software applications. In one aspect, the complexity of today's computing environments increases computing costs, and extends the time for a new product to reach the market.

Major problems arise where companies need to design, develop, and test software and hardware for use in such large and complex systems. Because today's applications are multi-tiered, it is no longer possible to develop or to test an application within a box. Not only must compatible hardware be selected, obtained, connected and tested; but each piece of software must be selected in accordance with hardware requirements, obtained (usually by complex multi-licensing arrangements), installed, configured and tested. Finally, in order to test the system at anywhere near operating capacity, many human testers may need to be analyze and exercise the system during alpha and beta testing.

Often, the task of adequately testing such systems is the single largest expense in designing and developing software, especially if a computing system developer acquires more computing resources than is necessary. For example, a software developer might commit a substantial investment of funds capital computing equipment only to find later the hardware either does not meet its requirements or the quantity of hardware is underutilized in its design of software-based computing products or resources.

Reliability and compatibility also are important aspects that software developers and users rely upon when selecting new software and hardware. As the numbers of computing devices of today's computing environments increase, computing development and operation costs increase as well. Complexity of such environments also extends the time for a new computing product to reach the market. Today's computing environments are burdened by the conventional infrastructure underlying the computing environments. For example, the conventional infrastructure is associated with undue costs and efforts necessary to procure, install, provision and maintain the infrastructure. The burden associated with the infrastructure of today increases non-linearly with the complexity of the computing devices and interconnectivity of such devices that comprise the infrastructure. Furthermore, the complexity also increases the need for unnecessary evaluation and re-evaluation of new technologies from different vendors that are added to the conventional infrastructure.

Thus, there is a need for a computing environment system that provides users and developers an appropriate amount of reliable computing resources which can be dynamically allocated or de-allocated. A dynamic computing environment according to the present invention overcomes the aforementioned problems and provides advantages over the prior art.

SUMMARY OF THE INVENTION

The present invention allows fast, efficient selection and configuration of processing networks and associated computers or computing devices, which can then be accessed and managed remotely. According to the present invention, the physical resources for implementing such a processing network are fully selectable and allocable by a system architect as a corresponding virtual resource. A system architect designs a system by allocating resources and specifying how the resources are to be used. The present invention allows fast allocation and configuration of resources such that different environments can be created from the same resources within minutes, or even seconds. This allows "time sharing" of overall resources so that a first environment can be "alive" or operative for a time period defined by the system architect, followed by second, third and fourth environments being instantly created for the next four hours for three different customers, and so on. After a time period expires, such environments might either manually or automatically de-allocate such resources. Since these "computing environments" can be dynamically configured and re-configured out of the same set of resources, these will also be referred to as "Dynamic Computing Environments".

A specific embodiment allows system architects to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, be located anywhere in the world such that labor costs are optimized.

The creation of dynamic computing environments ("DCE") is automatic.

Unlike the conventional computing infrastructure, according to an embodiment of the present invention there is no need to physically couple or de-couple each physical machine or resource to each other upon adding or removing such resources. There is no need to set-up Internet Protocol (IP) addresses or other network settings, or install operating systems and associated application programs on one or more physical machines, which must be under the control of the system architect. All such activities on a DCE can be performed automatically without user intervention.

In one embodiment of the present invention, a system using a computer system to provide a dynamic computing environment to a user, in which the dynamic computing environment is configured to communicate with and to operate under the control of the user. The dynamic computing environment has at least one virtual resource including one or more computer programs associated with the virtual resource. The system comprises a session manager configured to accept user inputs, an assets manager electrically coupled to the session manager, where the assets manager generates an association relating the virtual resource to at least one physical resource, a configuration manager electrically coupled to the session manager, where the configuration manager maintains an association of at least one virtual network with the virtual resource; and a device manager electrically coupled to the device services manager, where the device manager manages the association between the virtual resource and the physical resource.

In a specific embodiment of the present invention, the system includes a dynamic computing environment comprising a first virtual resource configured as a client, where the first virtual resource is a first virtual computing devices and a second virtual resource configured as a server, where the second virtual resource is a second virtual computing device. In this embodiment, the second virtual computing device is coupled to exchange information with the first virtual computing device. Additionally, a virtual sub-network includes the first and the second virtual computing device where the user has access to the client, the server, and the information exchanged.

DETAILED DESCRIPTION OF THE DRAWINGS

Figure 1A:
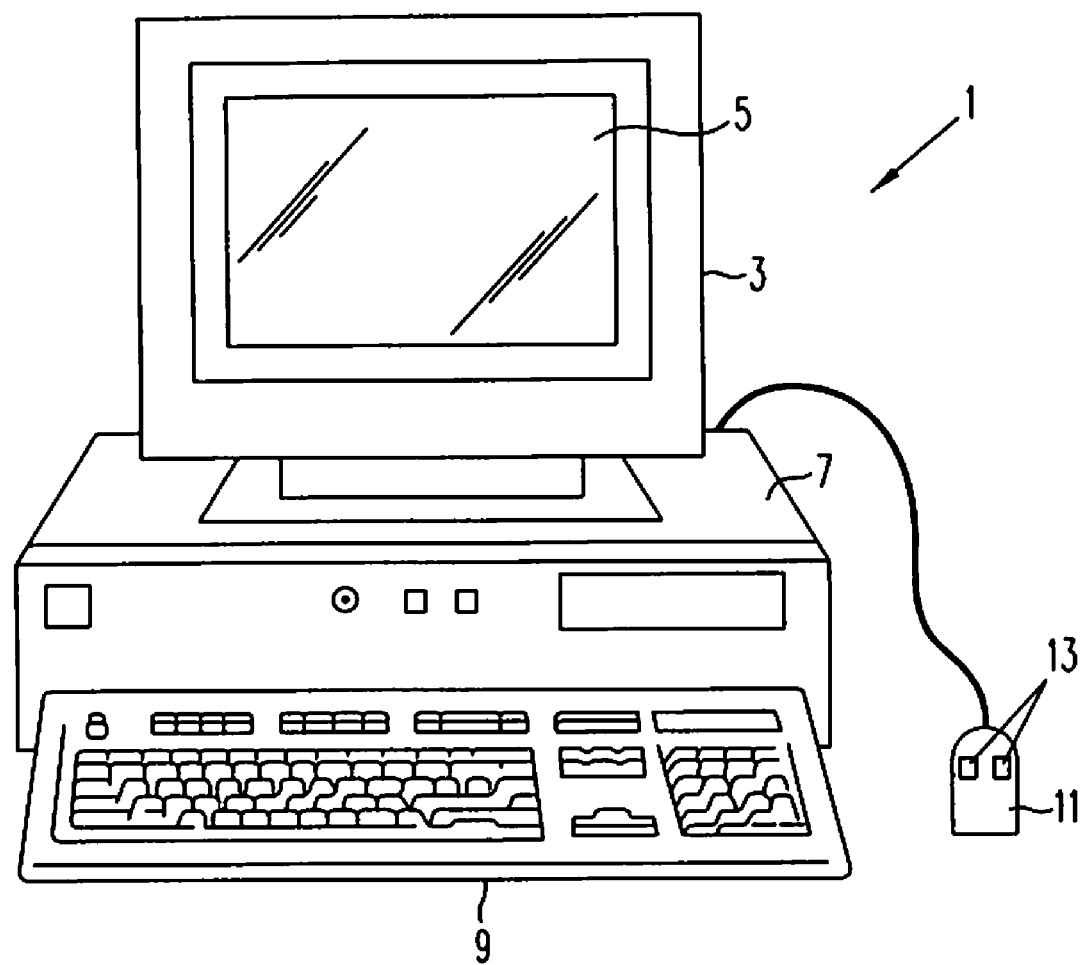
FIG. 1A illustrates a computer system suitable for use with the present invention.

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention allows fast, efficient selection and configuration of processing networks, which can then be accessed and managed remotely. The processing network is referred to as a system including "resources." A system resource is any hardware, software or communication component in the system. For example, discrete hardware devices include processing platforms such as computers or processors, mobile/laptop computers, embedded computing devices, hand-held computers, personal digital assistants, point-of-sale terminals, smart-card devices, storage devices, data transmission and routing hardware etc., without limitation. Additionally, computer peripherals such as monitors, input/output devices, disk drives, manufacturing devices, or any device capable of responding to, handling, transferring or interacting with digital data are also resources. Software, or any other form of instruction, is executed by processors in the system and is also a type of resource. Finally, communication resources are also part of the system such as a digital network's hardware including the network's configuration and topology, where control of the network is provided by software and/or hardware. Additionally, the network may be based on wired connections or wireless connections. For instance, the network hardware and software may be based on Bluetooth wireless standards.

For example, a processing network of a general consumer might include a PDA and a cell phone, each connected by wireless channels to a single personal computer, which in turn is connected to an email server at a remote location through the Internet. As another example, a processing network might include a personal computer running Microsoft Windows 98 operating system, a lap-top computer running Linux operating system, and another personal computer running Windows NT operating system along with router and firewall software, wherein all three computers are connected using a local Ethernet hub, and the router software routes connections to the Internet.

According to the present invention, the resources for such a processing network are fully selectable and allocable by a system architect. In a specific embodiment, a primary company, Jareva Technologies, Inc.® provides proprietary technology to a system architect for designing a system by allocating resources and specifying how the resources are to be used. The system architect can be an individual, corporate entity, etc. The system is referred to as an "environment"—or more specifically as a "computing environment" and the primary provider of such an environment is referred to as an Environment Service Provider (ESP). A typical system architect is referred to as the "customer." The primary provider obtains revenue for providing the resources and the tools to easily select, allocate, configure and run the environment.

The specific embodiment of the present invention allows fast allocation and configuration of resources such that different environments can be created from the same resources within minutes, or even seconds. This allows "time sharing" of overall resources so that a first environment can be "alive" or operative for a time period defined by the system architect (e.g., daily two-hour slot), followed by second, third and fourth environments being instantly created for the next four hours for three different customers, and so on. After a time period expires, such environments might either manually or automatically de-allocate such resources. Since these "computing environments" can be dynamically configured and re-configured out of the same set of resources, these will also be referred to as "Dynamic Computing Environments".

A specific embodiment allows customers to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, be located anywhere in the world such that labor costs are optimized.

The creation of dynamic computing environments ("DCE") is automatic. For example, a customer can request a web-site simulator using twelve web-page servers on a Microsoft® NT platform, two disk arrays at a specific bandwidth and storage capacity, two caching servers and 200 clients running Netscape Navigator™ under Microsoft Windows® 2000 using Pentium III™ processors at under 800 MHz. Such an environment is created and destroyed, and even re-created automatically, without human intervention each time. Unlike the conventional computing infrastructure, according to an embodiment of the present invention there is no need to physically couple or de-couple each physical machine or resource to each other upon adding or removing such resources. There is no need to set-up Internet Protocol (IP) addresses or other network settings, or install operating systems and associated application programs on one or more physical machines. All such activities on a DCE can be performed automatically without user intervention.

According to the present invention, the DCE is a virtual computing system including a network comprising a number of distinct types of machines and a network connecting them. For example, a system architect might require a DCE to include a Sun Sparc running a certain version of Solaris O/S coupled to a Linux machine. The present invention enables the separation of the activity of designing a DCE from the activity of actually creating the DCE. Designing a DCE includes choosing the specific hardware, choosing the operating systems or other software, and choosing the specific interconnections, etc. Creating a DCE includes allocating the resources, installing the operating systems and other software, etc. Furthermore, the present invention automates the process of creating the DCE. A DCE for which resources have not been allocated yet will also be referred to as a virtual computing environment. Similarly, a computing device (or a subnet) that is part of a DCE can also be referred to as a virtual computing device (or a virtual subnet).

The present invention provides a framework that enables configuring, provisioning, accessing and managing DCEs remotely. Configuring a DCE involves choosing the resources and their interconnections. The present invention supports operations for making such design choices through appropriate programmable interfaces. The interfaces can be used interactively through a graphical user interface such as a web page or non-interactively through a program script. Provisioning a DCE involves allocation of physical resources required for a DCE to function. The present invention manages the physical resources needed for provisioning DCEs and supports operations for allocating/de-allocating these resources. Accessing a DCE involves accessing one or more devices and/or sub-networks within the DCE. The present invention supports operations for accessing the components of a DCE. For instance, when a user needs to copy data from a specific computer to a backup storage device, operations involving "read" access to the computer and its local storage, "write" access to the storage device, and access to the network for transmitting the data will be used by the present invention to meet the user's needs. Managing a DCE involves managing the components of a DCE, such as a personal computer, a network router, etc.

In one embodiment of the present invention, a system that provides a framework for administering DCEs is implemented as a distributed system consisting of different software programs running on different computers and networking hardware. Administering DCEs, as described herein, refers to the configuring, provisioning, accessing, and managing of dynamic computing environments. In a further embodiment, the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure, provision, access, and manage DCEs.

A further understanding of embodiments of the present invention will be gained with reference to the diagrams and the descriptions that follow.

Figure 1B:
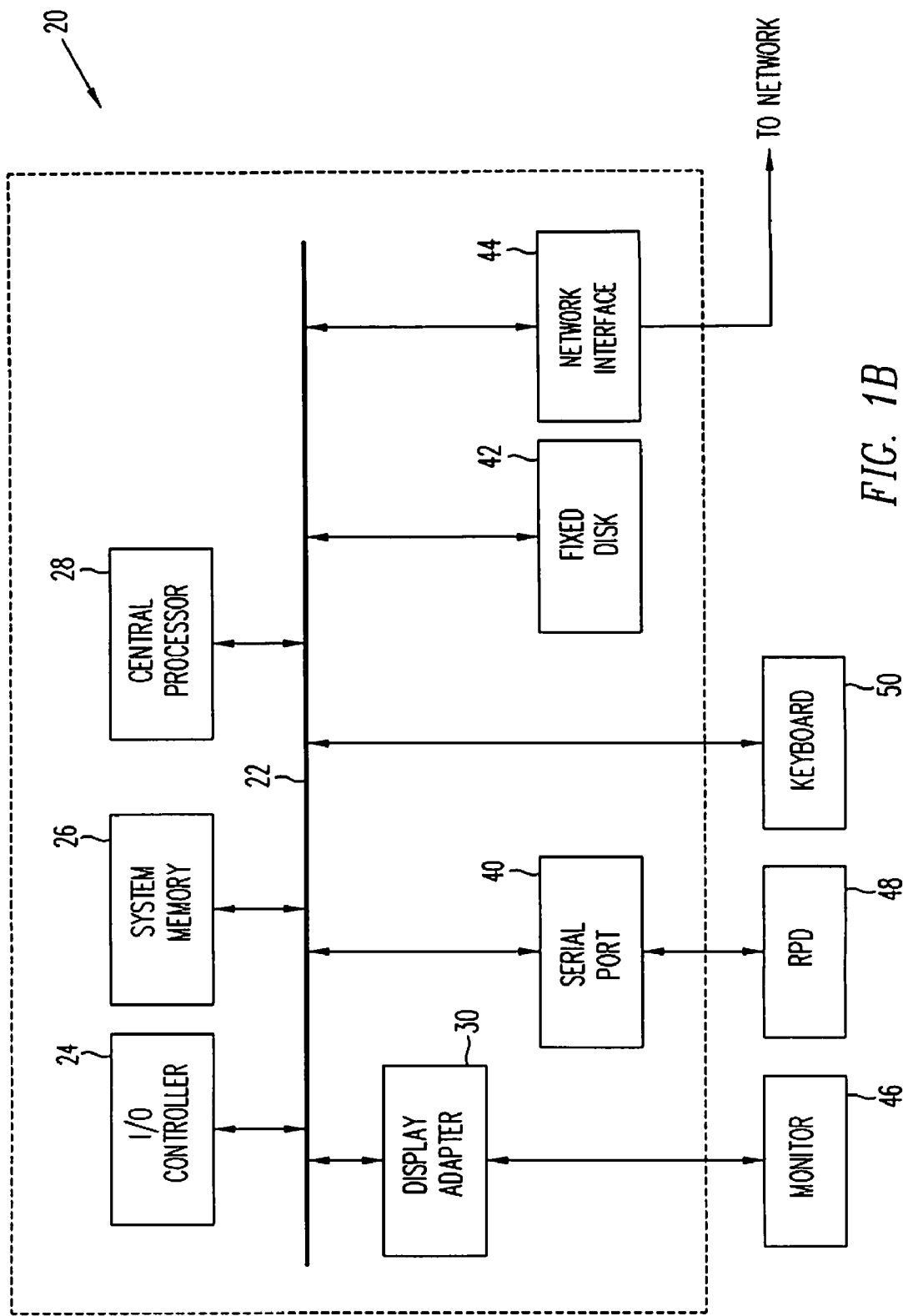
FIG. 1B shows basic subsystems in the computer system of FIG. 1A.
Figure 1C:
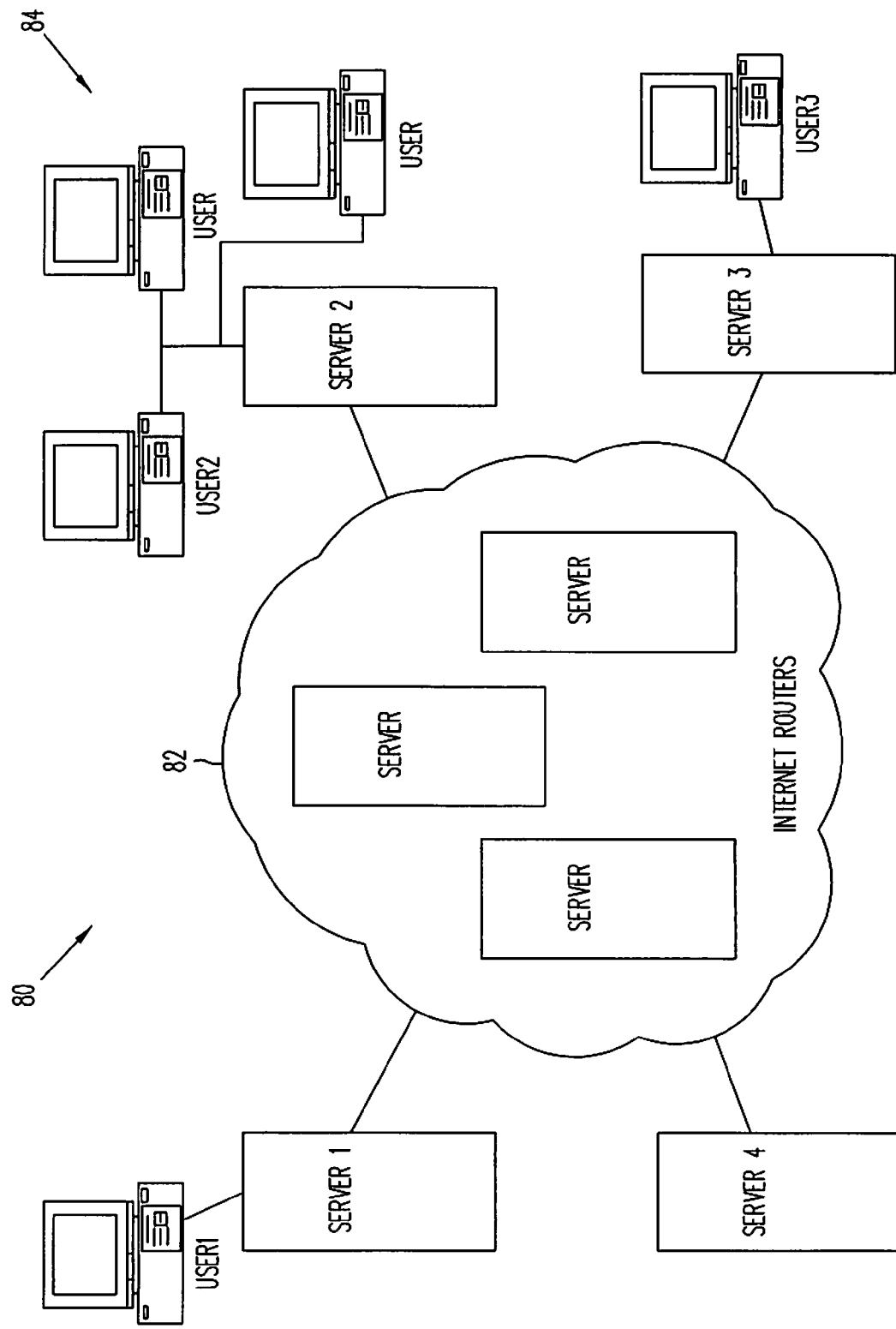
FIG. 1C is a generalized diagram of a typical computer network suitable for use with the present invention.

FIGS. 1A, 1B, and 1C illustrate basic hardware components suitable for practicing the present invention. FIG. 1A is an illustration of computer system 1 including display 3 having display screen 5. Cabinet 7 houses standard computer components (not shown) such as a display adapter, network card, computer readable storage media, such as a disk drive, CDROM drive, and random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44, which in turn is coupled electrically to a network. The use of bus 22 allows each of the subsystems to transfer data among subsystems and, most importantly, with the CPU, where the CPU might be a Sparc, an Intel CPU, a PowerPC, or the like. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system can be achieved without using all of the subsystems shown in FIG. 1B. For example, a standalone computer need not be coupled to a network so Network Interface 44 would not be required. Other subsystems such as a CDROM drive, graphics accelerator, etc. can be included in the configuration without affecting the nature or functionality of the system of the present invention.

FIG. 1C is a generalized diagram of a typical network that might be used to practice an embodiment of the present invention. In FIG. 1C, network system 80 includes several local networks coupled to the Internet. Although specific network protocols, physical layers, topologies, and other network properties are presented herein, the present invention is suitable for use with any network.

In FIG. 1C, computer USER1 is connected to Server1, wherein the connection can be by a network, such as Ethernet, or Asynchronous Transfer Mode, or by a modem, or by other means. The network provides the communication means, such as physical inter-connective links comprising copper wire, fiber optic cable, or the like, for transmitting and receiving signals. Wireless communication means, such as radio waves or the like, are also understood to provide means to transfer information from a source to a destination. Hence, the communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a specific embodiment, below.

Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 line or T3 line. Similarly, other computers 84 are shown utilizing a local network at a different location from USER1 Computer. The computers at 84 are coupled to the Internet via Server2. USER3 and Server3 represent yet a third installation. In a specific embodiment, a user of the present invention operates a user interface associated with computers 84 to at least virtually configure one or more computing devices as a subnet. Note that the use of the term "computing device" includes any processing device or platform such as a web television device, personal digital assistant (e.g., a Palm Pilot manufactured by Palm, Inc.), cellular telephone, etc.

As is well known in the art of network communications, a network is configured to communicate electrical information, such as a computer data signal comprising data (e.g., binary data bits) superimposed upon a radio or any other carrier wave. A person having ordinary skill in the art would appreciate that a carrier wave is electromagnetic energy propagated from a source by radiation, optical or conduction waves and is suitable for embodying an information-bearing signal, such as a computer data signal. In one embodiment, a carrier wave behaves, or is modulated, according to a network protocol, such as or Ethernet, IEEE 1394, TCP/IP, or any other communication protocol, so as to include computer data information. The carrier wave can be, for example, a direct current, an alternating current, or a pulse chain. In modulation of the carrier wave, it may be processed in such a way that its amplitude, frequency, or some other property varies so as to embody data for transfer.

Figure 2:
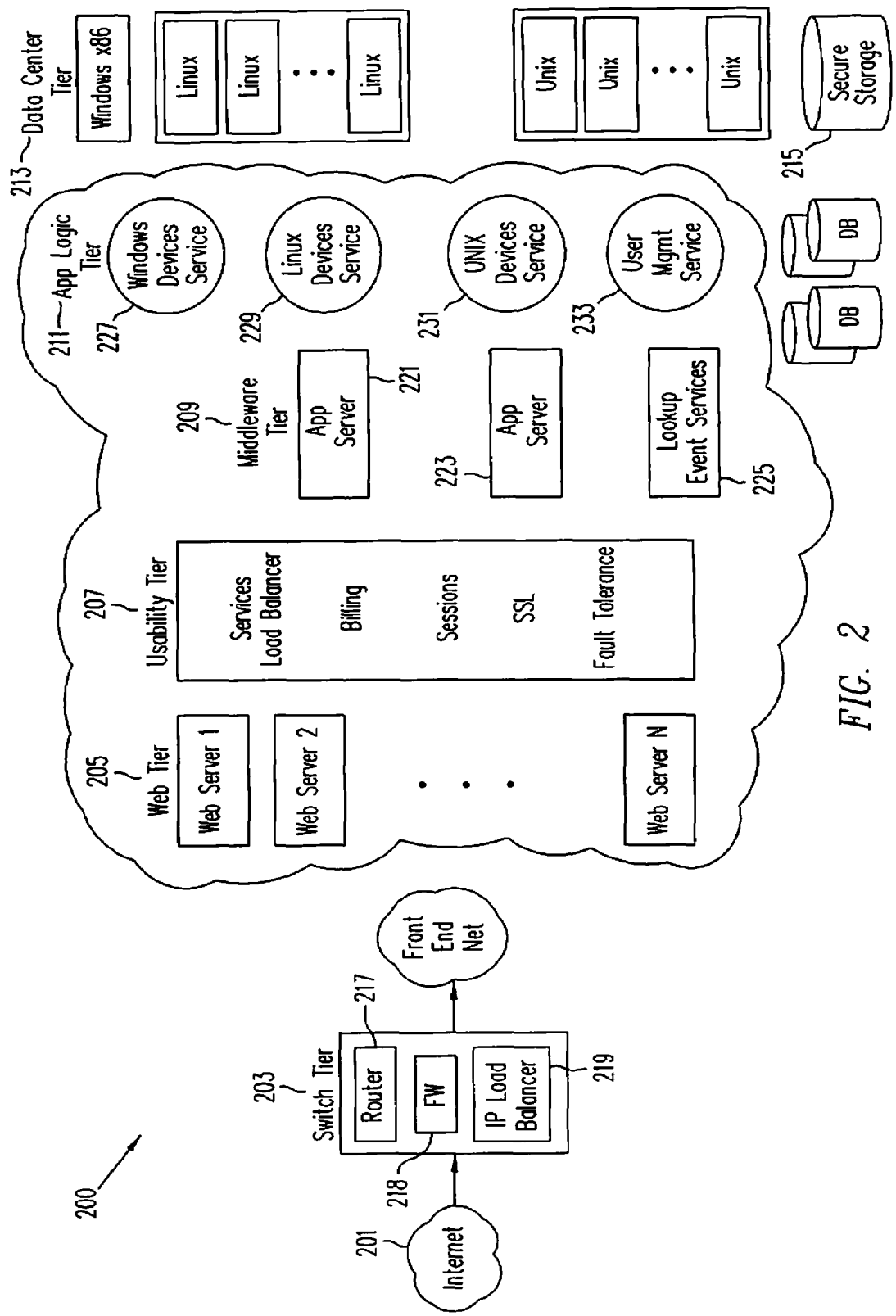
FIG. 2 illustrates a layered architecture for providing a Dynamic Computing Environment according to an embodiment of the present invention.

FIG. 2 is a block diagram illustrating the N-Tier architectural structure of system 200 for hosting one or more DCEs according to the present invention. In FIG. 2, system 200 comprises a number of tiers, namely a switch tier 203, a web tier 205 usability tier 207, middleware tier 209, application logic tier 211 and data center tier 213. One or more of the tiers are implemented using software (proprietary or third-party), or hardware or a combination thereof. Switch tier 203 includes a router 217 for routing data packets through the network, a firewall 218 and a load balancer 219 for balancing the load on web tier 205. The load balancer 219 ensures that each of the web servers in the web tier 205 receives roughly equal amounts of load and if one of the web servers goes down (i.e., becomes inoperable) the traffic is routed to other web servers in the web tier 205.

Exemplary load balancer 219 uses IP packets based load-balancing. Of course, one having ordinary skill in the art would appreciate that any other load balancing scheme may be used without affecting the nature of the switch tier 203 or any other tier. Router 217 may be a Cisco 7200 Series™ router available from Cisco, Inc.®, or alternatively, router 217 may be any other suitable type of router, or an equivalent device that provides substantially the same functionality. Web tier 205 comprises one or more web servers such as a Linux box running an Apache web server, for example, or other comparable type web servers. Usability tier 207 provides various services including load balancing (for the app-servers), billing, session management, security (SSL), and fault tolerance. SSL refers to Secure Socket Layer, which is a protocol developed by Netscape for transmitting private documents via the Internet.

Middleware tier 209 contains one or more application servers 221, 223 and a module 225 for implementing look up event and services. The primary function of the middleware tier is to delegate requests to specific services that are responsible for specific actions. For instance, these actions may involve accessing the database, accessing the storage, or accessing a computing device. The processes running on the application servers 221 and 223 make such delegation decisions and are further illustrated in FIG. 3. BEA WebLogic™ servers running on a Solaris® platform, for example, or the like are suitable to implement application servers 221 and 223.

Since one or more of the services in the Application logic tier 211 may be replicated and be running on independent physical machines, they need to be "looked-up" for availability. Using such a lookup service will allow the services in the Application logic tier 211 to be started or shut down asynchronously. That is, the starting or shutting down of the services related to logic tier 211 need not be synchronized with the processes on the application servers 221 and 223. For instance, increasing the number of Linux boxes—as capacity devices in Data Center tier 213—may require increasing the number of Linux device services, and this can be done without the knowledge of the application server(s) by automatically replicating the Linux device services and notifying the lookup service. In addition, the services in the Application logic tier 211 may have to provide notice of events (such as a storage unit is full, or there are no more Linux boxes available) to the application servers 221 and 223. Such notification can be done through Lookup/Event services. Lookup/Event services can be provided through Sun Microsystems' Jini software layer, for example. Of course, other implementations of the lookup/event services using proprietary or third party software are possible.

Application logic tier 211 provides a variety of operating systems device services such as Windows 227, Linux 229, Unix 231 device services. These device services are responsible for managing physical devices available in the data center tier 213. User management service 233 is implemented within application logic tier 211 and establishes and maintains each user's configured virtual machines within a DCE. Such information is stored in the database associated with the application logic tier 211. Data center tier 213 includes various operating system platforms and processors, also selectable by the user. Data center tier 213 also includes networking and storage resources as well. Although not shown, one of ordinary skill in the art will realize that one or more of the aforementioned tiers and components therein can be implemented using third party providers, dedicated custom modules or software and hardware or a combination thereof.

Figure 3:
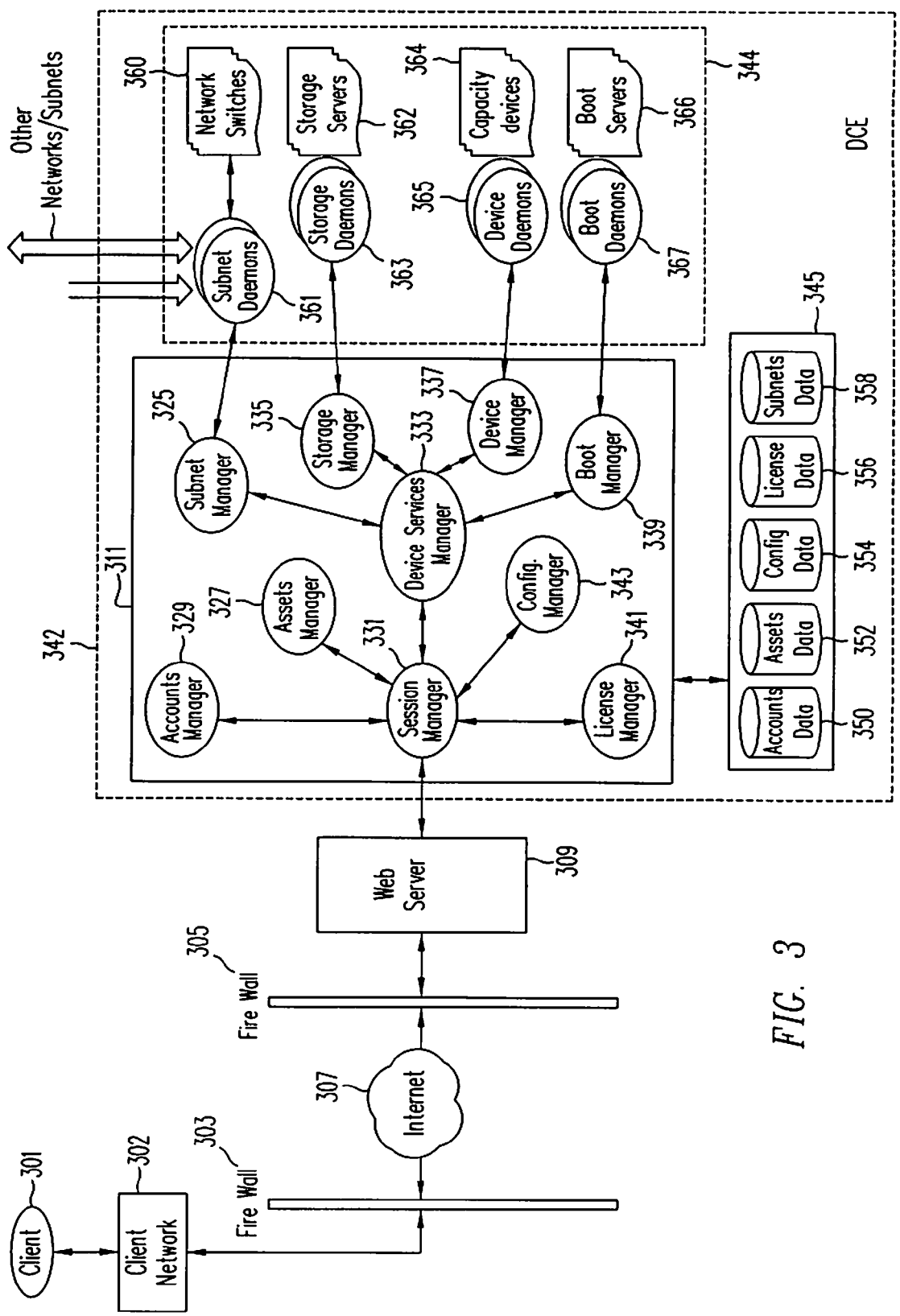
FIG. 3 is a block diagram of an apparatus for providing a Dynamic Computing Environment according to an embodiment of the present invention.

FIG. 3 is a block diagram illustrating an embodiment of the present invention. Exemplary system 342 is configured to host and administer a DCE and FIG. 3 shows the component architecture of the system 342 rather than the layering architecture shown in FIG. 2. As shown, exemplary system 342 is communicatively coupled through both an Internet 307 and a client network 302 to a client 301. Web server 309, although optional, is depicted in FIG. 3 to provide a web-based interface for realizing this communicative coupling. Although only one client 301 is shown, it should be understood that the system 300 could include many clients 301.

Firewalls 303 and 305 maintain security within the client network 302 and the system 342, respectively. In the exemplary configuration shown in FIG. 3, a web server 309 is coupled between the Internet 307 and the system 342. Exemplary web server 309 could be any commercially available web server machine and/or software that supports Java Servlets and JSP (Java server pages). Web server 309 uses the servlets and the JSP pages to receive requests from any web client, such as a browser, and forward such requests to the application server 311, and return the results from the application server 311 to the client 301. The web server 309 communicates with the application server 311, for example, using an XML-based interface programming language. This language provides complete separation of the functionality of the system from the presentation aspects of the system as viewed by a user at the user interface of the client 301. A person having ordinary skill in the art of data processing would appreciate the use of XML, or other suitable languages, to practice the present invention.

The connection between client 301 and web server 309 may either be, for example, a secure or an insecure connection. For instance, the connection may use the Secure Socket Layer (SSL) protocol to ensure security of the data transmission between client 301 and web server 309. If an embodiment of the invention were to be used inside the secure boundaries of an organization, then a secure connection would be redundant. Secure boundaries include closed networks, such as internal LANs, that are not accessible to public networks.

Exemplary web server 309 could include two or more web servers 309 for providing a proportionate number of clients 301 with user access to each of their DCEs. In another embodiment, the web server 309 can be removed from the system 300 and if necessary, replaced with a proprietary user interface. For example, a third-party provider, such as a data center, need not require a web server 309 to access or use the administrative framework. An example of such a proprietary user interface is a native application on the client computer 301, which facilitates user interaction with the system 342 using program scripts.

According to a specific embodiment of the present invention, the system 342 includes application server 311, a data repository 345, and resource infrastructure elements 344.

Application server 311 operates to present to a user at a client 301 methods to create a DCE, methods to allocate physical resources required for a DCE, and methods to manage and to interact with a DCE as well as its components. Resource infrastructure elements 344 provide the physical resources, such as computing devices, storage devices, etc., and their control processes, which include operating systems, storage management software, etc. In one embodiment of system 342, application server 311, data repository 345, and the resource infrastructure elements 344 might reside in a single network, or might reside in separate networks. In a specific embodiment of the present invention, application server 311 includes at least a session manager 331 and a device service manager 333.

In another embodiment, application server 311 also includes accounts manager 329, subnet manager 325, storage service manager 335, asset manager 327, license manager 341, device manager 337, configuration manager 343 and boot manager 339. Although not shown, one having ordinary skill in the art would understand that each of the aforementioned features are operably disposed in one or more servers within a distributed environment. That is, each of the managers need not reside in a single application server 311, but rather might be operably disposed over two or more machines. Also, more than one application server 311 might be used as part of a system 342.

Application server 311, for example, is any commercially available machine and application server software that supports Enterprise Java Beans (EJB) and Java Data Base Connectivity (JDBC). One such application server might be a BEA Weblogic server (i.e., software) running on a Solaris Sparc server (i.e., computing device). As a further example, the managers of the application server 311 are configured to operate as EJB components for handling specific aspects of the functionality of system 342. It should be understood that any other suitable software, whether commercially available or proprietary, also might be used in place or in conjunction with EJB server software.

Session manager 331 is configured to operate as an intermediary between client 301 and the components of the application server 311. Exemplary session manager 331 is configured to communicate with each of the other managers and components within the application server 311 and operates to manage each session for each of the clients 301. A session is the period of time from the user logging in to the user logging out, for a given user under a given account. In one embodiment, session manager 331 functions to route requests from the client 301 to the appropriate manager to perform the requested task. Session manager 331 uses, for example, a Java session bean to handle client requests. A "bean" as described herein refers to a component, which is a reusable program building block that can be combined with other components in the same or other computers in a distributed network to form an application.

Not only does session manager 311 coordinate the flow of information communicated between web server 309 and the application server 311, the session manager 311 monitors and archives the activities of each of the users at client 301 for any given session. The session manager also handles verification of the user's capabilities to perform any given action. For example, a session manager 331 coordinates information related to the user, the capabilities of the user, machine configurations associated with the user's account, as well as commands to open windows on machines or to shut down machines. Although information flowing from the session manager 311 includes configuration state information, acknowledgments, errors, etc., a typical session manager 331 performs little or no computations and has no state.

Accounts manager 329, which is sometimes referred to as a user manager, is configured to communicate with the session manager 331 and operates to create, maintain and remove all user account information specific to each user at one or more clients 301. Such information includes the login name, password, user name, email address and the authorized activities for each of the users. It will be apparent to one of ordinary skill in the art that such information may be stored in any type of data structure known in the art, and furthermore, any additional information fields may be added to a user account as proves necessary.

License manager 341 is configured to communicate with the session manager 331 and operates to create, maintain and remove the licenses associated with each of the activated operating systems and applications used by the system 342. For example, each operating system has a maximum number of licensed uses associated with it and the license manager 341 prevents the system and its administrative framework from allocating licenses exceeding this maximum number. Each license as managed by license manager 341 is represented by data implemented as an entity bean, for example.

Asset manager 327 is configured to communicate with the session manager 331 and operates to create, maintain and remove a data structure including data representing the information regarding the physical resources that are part of the resource infrastructure elements 344. Asset manager 327 monitors the use and assignment of soft assets, such as IP addresses, operating systems (by license) and application software (by license), to hard assets, such as computers and network/sub-network switches, without handling or assigning assets directly.

In one embodiment, the asset manager 327 receives information from the session manager 331 based on actions performed by a user at client 301, or by events which were triggered by such actions. An example of such an event is when a user is assigned a computer (i.e., computer ID number) from the pool of resource infrastructure elements 344. The session manager 331 conveys such information to the assets manager 327, and the asset manager responds by reserving such a computer and removing its ID from the pool of available computing resources. Another example of an event is when a user account associated with a client 301 is closed, all the computer IDs associated with such an account are released so that the computers are added to the pool of available assets. Session manager 331 thereafter requests that the account manager 329 remove the corresponding account information.

Configuration manager 343 is configured to communicate with the session manager 331 and operates to create, maintain and remove a data structure of data representing the information regarding all the DCEs currently administered by system 342. Some of the DCEs may be virtual i.e., physical resources required for a DCE may not have been allocated yet. For each DCE, configuration manager 343 also maintains its network configuration and the configuration of each virtual machine in the DCE with respect to its operating system and application software associated with the virtual machine. Configuration manager 343 also creates or removes the configuration information when a DCE is created or removed by the user.

For example, if a user at client 301 creates a DCE including two Sun Sparc-based machines coupled to several high capacity storage devices, the configuration manager will create a database entry to store the physical computer IDs associated with the virtual Sun machines and the storage device IDs associated with the virtual storage device or devices. The DCE, for example, is represented as a virtual sub-network, or subnet, and is associated with a collection of disjoint root subnets and nested subnets, which include the virtual machines and storage devices. Although the virtual subnet presented to the user at client 301 is a collection of virtual computing devices (e.g., virtual machines, computer devices, storage devices or any other allocable device or resource in the DCE) under a single virtual subnet, each of the physical machines and storage devices need not be associated with a physical switch, as is the case in typical subnets used in conventional computing environments.

Device services manager 333 functions as an intermediary, between the session manager 331 and the resource infrastructure elements 344. Device services manager 333 is configured to communicate with various managers, such as subnet manager 325, storage manager 335, device manager 337, and boot manger 339. Such managers are used to communicate with the resource infrastructure elements 344 to control the physical resources associated with the virtual computing devices. Device services manager 333 is electrically coupled to the session manager 331 and each of the various managers to receive control signals from the session manager 331 for activation to control the various managers.

Thus, the device services manager 333 coordinates all requests for the physical devices within the resource infrastructure elements 344, such as computing devices, network devices or storage devices. Device services manager 333 is responsible for setting up, shutting down and accessing physical devices. Session manager 331 redirects all permissible requests that involve access to one or more physical devices to the device services manager 333 so it can delegate one or more actions, depending on the request, to one of the following: the subnet manager 325, the storage manager 335, the device manager 337, or the boot manager 339. Also, similar to the session manager 331, device services manager 333 has no state, and its primary purpose is to coordinate operations between other managers, such as the subnet manager 325, the storage manager 335, the device manager 337, and the boot manger 339.

Device services manager 333 further operates to communicate with boot manager 339 to both allocate and de-allocate, or free, IP addresses for the physical machines. Device services manager 333 also initiates and controls mounting and unmounting the shared persistent storage on the physical devices and machines by communicating and coordinating such actions with storage manager 335.

Device service manager 333 further serves as intermediary when a user tries to access the console of a specific computing device. Access to a computing device can be enabled by using a VNC viewer, for example, a viewer using the Remote Frame Buffer (RFB) protocol. Virtual Network Computing (VNC) viewer is third party software which can be used, in one embodiment, for providing console terminal access to a computing device which is part of the DCE. Such a viewer is used to display the screen of a computing device when the user chooses to "open a terminal" for a device in the DCE. VNC viewer is but one way of providing such access and other software, whether proprietary or from a third-party vendor, can be used for this purpose. Such software may use the RFB protocol or another appropriate protocol depending on the device being accessed and the device used for accessing it.

Also, device services manager 333 initiates and coordinates installing and uninstalling applications and operating systems on select physical machines and devices allocated for a DCE. In the case where device service manager 333 performs the installs and uninstalls of software, the device service manager 333 sends such information to the license manager to update the number of licenses in use. Additionally, although not shown, one of ordinary skill in the art will realize that one or more functions performed by the device service manager 333 may be separated into either sub-managers, or as other service layers consistent with the spirit and scope of the present invention.

Storage manager 335 operates to keep create, maintain and remove shared storage in each user's session, as initiated by session manager 331 and controlled by device service manager 333. Storage manager 335 allocates storage for a virtual subnet and mounts, or unmounts, this storage on all of the physical machines associated with the subnet. Storage manager 335 is configured to communicate between device service manager 333 and respective physical devices and machines of the resource infrastructure elements 344. In one embodiment, the interfaces between storage manager 335 and the device service manager 333 are each implemented as a session bean.

Device Manager 337 is configured to receive instructions from device services manager 333 and is further configured first to allocate or to de-allocate one or more physical machines or devices within resource infrastructure elements 344, and then second, to assign one or more of these machines as virtual machines selected and managed by configuration manager 343. For instance, when a user requests ten Windows NT computers, the device manager 337 first verifies whether ten physical Windows NT computer devices within the physical infrastructure elements 343 are available, and then allocates such machines to a particular DCE.

Device manager 337 also operates to install the proper operating system on one or more physical machines when the device service manager 333 requests the particular physical machine with a particular operating system (i.e., includes one of many versions of software). Device manager 337 further functions to return a machine into a free pool when released by the device service manager 333. In addition, if an actively assigned physical machine crashes, device manager 337 informs the device services manager that such a crash occurred. It should be noted that the interface between the device manager 337 and the rest of the other managers or the physical infrastructure elements 343 of the DCE system 342 is implemented as a session bean.

Boot manager 339 is configured to receive instructions from device service manager 333 and is further configured to provide instructions to one or more boot servers within the physical infrastructure elements 343. Boot manager 339 functions to retrieve and assign, or to frees IP addresses associated with physical machines. For example, the boot manager 339 allocates an IP address for a physical machine before it is started up (i.e., booted up) and frees the address after the machine shuts down.

Subnet manager 325 is configured to receive delegated instructions from the device service manager 333 and operates to allocate or de-allocate a subnet. A subnet is a portion of a network that shares a common address component, but need not share common physical network devices, such as switches. On TCP/IP networks, subnets are defined as all physical devices and machines whose IP addresses have the same prefix. For example, all physical devices with an IP address starting with 100.100.100 would be part of a single subnet. The present invention may use other networks instead of TCP/IP networks and hence other means of defining a subnet. Dividing a network into subnets is useful for both security and performance reasons, as is the case with the present invention.

Each of the managers included in application server 311 are configured to communicate data and instructions for fetching, storing and updating information stored in repository 345. For example, account manager 329 is coupled to exchange information with the accounts database 350 and stores user information for account manager 329. Assets manager 327 is coupled to exchange information with the assets data base 352 for storing, updating and fetching data representing the status of physical assets, as determined by assets manager 327. Configuration manager 343 is coupled to device configuration database 354 for storing, updating and fetching data representing the status of configuration information associated with the DCEs supported by the system 342.

License manager 341 is coupled to license database 356 for storing, updating and fetching data representing the status of licenses associated with operating systems and application software related to the configured virtual machines. Subnet manager 325 is coupled to subnet database 358 for storing, updating and fetching data representing the physical machines and network devices associated with each virtual subnet. Each database and its constituent data structures and data within repository 345 might be separated and configured as independent databases.

The databases described above might be a single Oracle database or might comprise several Oracle databases. In another example, these databases use a database server running SQL 7.0 database server software by Microsoft and hosts additional databases each serving specific functions. Each of the managers of application server 311 are configured to use Java beans to encapsulate database tables, so that the components can access and update the data structures (i.e., tables) of data repository 345 through these beans. The beans used by the managers included in application server 311 connect to these databases through the Java Data Base Connectivity (JDBC) protocol. Of course, as one skilled in the art would appreciate, these managers can use other means of connectivity and/or encapsulation to communicate with the databases. Furthermore, the data structures of each of the databases are those most suitable for practicing the present invention, as one skilled in the art would appreciate.

Resource infrastructure elements 344 include physical resources as well as resource handlers (i.e., physical resource managers). Physical resources include one or more network switches 360, one or more storage devices/storage servers 362, and one or more capacity devices 364 (i.e., PCs, PDAs, etc.). Resource handlers include specific daemons to control the physical resources: boot daemons 367, device daemons 365, storage daemons 363, and subnet daemons 361. For example, a Jini interface is used to discover and lookup these specific daemons, which handle associated physical devices. Each of the daemons and their respective processes register themselves with a Jini registry so that the daemons and their respective processes can be discovered/looked-up remotely on demand. For instance, when the boot manager 339 tries to boot a computer of capacity device 364, it needs to locate a boot daemon 365, which maintains information regulating the state of the computer to boot the specific computer.

One or more boot daemons 367 are daemon process running on a boot server 366, which typically is a Linux machine. When a boot manager 339 receives a boot request it locates the boot daemon 367 corresponding to the machine of capacity device 364 to be booted and then the boot daemon 367 reboots the specific machine of capacity device 364.

Storage daemon(s) 363 are daemon processes running on one or more storage servers 362, which are typically Sun Sparc servers controlling a RAID storage unit. A RAID—Redundant Array of Inexpensive Disks—storage unit is a reliable storage medium consisting of an array of disks such that every bit of data is stored redundantly as multiple copies within the array. The storage is used for storing all software and data required to support the computing devices in all the DCEs hosted by the system 342.

Subnet daemon(s) 361 are daemon process running on a Linux machine and are responsible for communicating to one or more network switches 360. When a request for subnet allocation is received by the subnet manager 325, it delegates the request to one of the subnet daemons 361 depending on availability. The switches control the physical subnet connections allocated for each subnet in each DCE.

Although the present invention has been discussed with respect to specific embodiments, one of ordinary skill in the art will realize that these embodiments are merely illustrative, and not restrictive, of the invention. The scope of the invention is to be determined solely by the appended claims.

What is claimed is:

1. A computer readable storage medium comprising program instructions, wherein the program instructions are executable to implement:
   a configuration manager, wherein the configuration manager is configured to generate an association relating at least one virtual resource to at least one physical resource, wherein the configuration manager is configured to maintain information identifying a configuration of the at least one virtual resource included in a dynamic computing environment requested by a user, and wherein the information identifying the configuration of the at least one virtual resource comprises information identifying one or more computer programs associated with the at least one virtual resource; and
   a device manager, wherein the device manager is configured to allocate the at least one physical resource as the at least one virtual resource within the dynamic computing environment, wherein the device manager is configured to install the one or more computer programs on the at least one physical resource, and wherein the user has access to interact with the dynamic computing environment including the at least one virtual resource and the at least one physical resource.

2. The computer readable storage medium of claim 1, wherein the program instructions are further executable to implement a device services manager, and wherein the device services manager is configured to provide an interface between the user and the at least one physical resource.

3. The computer readable storage medium of claim 2, wherein the interface is coupled to a manager of the at least one physical resource to coordinate a function to be performed by the at least one virtual resource, and wherein the interface is under control of an interface computer program.

4. The computer readable storage medium of claim 1, wherein the program instructions are further executable to implement a boot manager, and wherein the boot manager is configured to initialize the at least one physical resource.

5. The computer readable storage medium of claim 1, wherein the program instructions are further executable to implement a sub-net manager, wherein the sub-net manager is configured to manage a virtual sub-network associated with a virtual network, and wherein the virtual sub-network includes a virtual resource associated with a physical resource.

6. The computer readable storage medium of claim 1, wherein the program instructions are further executable to implement a storage manager, wherein the storage manager is configured to manage one or more physical storage devices, and wherein the storage manager provides virtual storage to store data from the at least one virtual resource.

7. The computer readable storage medium of claim 1, wherein the program instructions are further executable to implement an account manager, wherein the account manager is configured to manage data representing a user account, and wherein the user account is associated with the user.

8. The computer readable storage medium of claim 1, wherein the program instructions are further executable to implement a license manager, and wherein the license manager is configured to manage data representing the use of at least one license associated with the one or more computer programs.

9. A system comprising:
- a computing device configured to implement an application server,
  - wherein in response to receiving a request to create a dynamic computing environment from a user, the application server is configured to generate configuration information identifying a plurality of virtual devices included in the dynamic computing environment,
  - wherein the configuration information further includes a physical identifier of a physical device associated with at least one of the virtual devices,
  - wherein the configuration information further includes information identifying software associated with the at least one of the virtual devices,
  - wherein the application server is configured to write the configuration information to a database,
  - wherein the application server is configured to install the software on the physical device and to allocate the physical device to the dynamic computing environment, based upon the configuration information, and
  - wherein allocation of the physical device allows the user to interact with the physical device via the application server.

10. The system of claim 9, further comprising a data repository configured to store the database.

11. The system of claim 9, further comprising a plurality of resource infrastructure elements, wherein the plurality of resource infrastructure elements comprise one or more computing devices, one or more storage devices, and one or more network devices, and wherein the plurality of resource infrastructure elements comprise the physical device.

12. A method comprising:
- receiving a request to create a dynamic computing environment from a user;
- generating configuration information identifying a plurality of virtual devices included in the dynamic computing environment, in response to receipt of the request,
  - wherein the configuration information further includes a physical identifier of a physical device associated with at least one of the virtual devices,
  - wherein the configuration information further includes information identifying software associated with the at least one of the virtual devices,
- storing the configuration information to a database;
- provisioning the dynamic computing environment based upon the configuration information,
  - wherein the provisioning comprises installing the software on the physical device and allocating the physical device to the dynamic computing environment; and
- providing an interface to allow the user to interact with the dynamic computing environment.

* * * * *